United States Patent
Park

(10) Patent No.: US 11,348,510 B2
(45) Date of Patent: May 31, 2022

(54) STAIN COMPENSATION METHOD USING SCREEN CALIBRATION SYSTEM

(71) Applicant: SAMSUNG DISPLAY CO., LTD., Yongin-si (KR)

(72) Inventor: Sung Hwan Park, Yongin-si (KR)

(73) Assignee: SAMSUNG DISPLAY CO., LTD., Gyeonggi-do (KR)

( * ) Notice: Subject to any disclaimer, the term of this patent is extended or adjusted under 35 U.S.C. 154(b) by 0 days.

(21) Appl. No.: 16/990,451

(22) Filed: Aug. 11, 2020

(65) Prior Publication Data

US 2021/0056888 A1  Feb. 25, 2021

(30) Foreign Application Priority Data

Aug. 21, 2019  (KR) ........................ 10-2019-0102542

(51) Int. Cl.
*G09G 3/20* (2006.01)
*G09G 3/3275* (2016.01)
*G02B 27/01* (2006.01)
*G09G 3/04* (2006.01)

(52) U.S. Cl.
CPC ....... *G09G 3/2092* (2013.01); *G02B 27/0172* (2013.01); *G09G 3/04* (2013.01); *G02B 2027/0118* (2013.01); *G09G 2320/02* (2013.01); *G09G 2320/0693* (2013.01); *G09G 2360/14* (2013.01)

(58) Field of Classification Search
CPC ........ G09G 3/2092; G09G 3/04; G09G 3/006; G09G 3/3233; G09G 2320/02; G09G 2320/0693; G09G 2320/0233; G09G 2320/0242; G09G 2320/0686; G09G 2320/0285; G09G 2320/029; G09G 2360/14; G09G 2300/0819; G09G 3/3275; G09G 2300/0439; G02B 27/0172; G02B 2027/0118
See application file for complete search history.

(56) References Cited

U.S. PATENT DOCUMENTS

| | | | |
|---|---|---|---|
| 9,007,408 B2 | 4/2015 | Jeon et al. | |
| 2015/0030065 A1* | 1/2015 | Gough | H04N 19/88 375/240.2 |
| 2017/0206842 A1 | 7/2017 | An et al. | |
| 2021/0074222 A1* | 3/2021 | Meng | G09G 3/3233 |

FOREIGN PATENT DOCUMENTS

| | | |
|---|---|---|
| KR | 1020170087558 A | 7/2017 |
| KR | 101929001 B1 | 12/2018 |

\* cited by examiner

*Primary Examiner* — Xuemei Zheng
(74) *Attorney, Agent, or Firm* — Cantor Colburn LLP

(57) ABSTRACT

A stain compensation method using a screen calibration system includes generating first parameter data including first data blocks, each defined by at least one emission area, by photographing a display surface, generating second parameter data including second data blocks, the second data blocks being generated by merging first data blocks that are adjacent to each other in one direction and have an identical average grayscale value, and storing the second parameter data in a memory.

20 Claims, 22 Drawing Sheets

FIG. 6

| BLK1 | | | | | | | | | | | | | ISD1 |
|---|---|---|---|---|---|---|---|---|---|---|---|---|---|
| 217 | 217 | 217 | 217 | 217 | 217 | 219 | 218 | 219 | 218 | 219 | 218 | 219 | 222 |
| 217 | 217 | 217 | 217 | 217 | 219 | 220 | 219 | 220 | 219 | 220 | 219 | 220 | 221 |
| 217 | 217 | 217 | 219 | 219 | 220 | 221 | 220 | 221 | 220 | 221 | 220 | 221 | 222 |
| 217 | 217 | 219 | 221 | 222 | 223 | 224 | 223 | 224 | 223 | 224 | 223 | 224 | 223 |
| 218 | 220 | 221 | 223 | 224 | 225 | 225 | 225 | 225 | 225 | 225 | 225 | 225 | 225 |
| 220 | 221 | 223 | 224 | 225 | 225 | 225 | 225 | 225 | 225 | 225 | 225 | 225 | 225 |
| 218 | 220 | 221 | 224 | 225 | 225 | 225 | 225 | 225 | 225 | 225 | 225 | 225 | 225 |
| 220 | 221 | 223 | 224 | 225 | 225 | 225 | 225 | 225 | 225 | 225 | 225 | 225 | 225 |
| 218 | 220 | 221 | 224 | 225 | 225 | 225 | 225 | 225 | 225 | 225 | 225 | 225 | 225 |
| 220 | 221 | 223 | 224 | 225 | 225 | 225 | 225 | 225 | 225 | 225 | 225 | 225 | 225 |
| 218 | 220 | 221 | 224 | 225 | 225 | 225 | 225 | 225 | 225 | 225 | 225 | 225 | 225 |
| 220 | 221 | 223 | 224 | 225 | 225 | 225 | 225 | 225 | 225 | 225 | 225 | 225 | 225 |
| 218 | 220 | 221 | 224 | 225 | 225 | 225 | 225 | 225 | 225 | 225 | 225 | 225 | 225 |
| 220 | 221 | 223 | 224 | 225 | 225 | 225 | 225 | 225 | 225 | 225 | 225 | 225 | 225 |
| 218 | 220 | 222 | 224 | 225 | 225 | 225 | 225 | 225 | 225 | 225 | 225 | 225 | 225 |
| 220 | 221 | 224 | 225 | 225 | 225 | 225 | 225 | 225 | 225 | 225 | 225 | 225 | 225 |
| 221 | 224 | 225 | 225 | 225 | 225 | 225 | 225 | 225 | 225 | 225 | 225 | 225 | 225 |
| 224 | 225 | 225 | 225 | 225 | 225 | 225 | 225 | 225 | 225 | 225 | 225 | 225 | 225 |
| 225 | 225 | 225 | 225 | 225 | 225 | 225 | 225 | 225 | 225 | 225 | 225 | 225 | 225 |
| 225 | 225 | 224 | 223 | 224 | 223 | 224 | 223 | 224 | 223 | 224 | 223 | 225 | 225 |
| 225 | 224 | 223 | 222 | 223 | 222 | 223 | 222 | 223 | 222 | 223 | 222 | 223 | 224 |
| 224 | 223 | 222 | 221 | 222 | 221 | 222 | 221 | 222 | 221 | 222 | 221 | 222 | 223 |
| 223 | 222 | 221 | 220 | 221 | 220 | 221 | 220 | 221 | 220 | 221 | 220 | 221 | 222 |
| 222 | 219 | 219 | 219 | 219 | 219 | 219 | 219 | 219 | 219 | 219 | 219 | 219 | 219 |
| 219 | 219 | 219 | 219 | 219 | 219 | 219 | 219 | 219 | 219 | 219 | 219 | 219 | 220 |
| 219 | 219 | 219 | 219 | 219 | 219 | 219 | 219 | 219 | 219 | 219 | 219 | 219 | 221 |

FIG. 11

ISD2_1

BLK2

| | | | | | | | | | | | |
|---|---|---|---|---|---|---|---|---|---|---|---|
| | | | | ← 217 | 219 | 218 | 219 | 218 | 219 | 218 | 219 | 222 |
| | | | ← 217 | 219 | 220 | 219 | 220 | 219 | 220 | 219 | 220 | 221 |
| | | ← 217 | 219 | 219 | 220 | 221 | 220 | 221 | 220 | 221 | 220 | 221 | 222 |
| | ← 217 | 219 | 221 | 222 | 223 | 224 | 223 | 224 | 223 | 224 | 223 | 224 | 223 |
| 218 | 220 | 221 | 223 | 224 | | | | | | | ← 225 |
| 220 | 221 | 223 | 224 | | | | | | | | ← 225 |
| 218 | 220 | 221 | 224 | | | | | | | | ← 225 |
| 220 | 221 | 223 | 224 | | | | | | | | ← 225 |
| 218 | 220 | 221 | 224 | | | | | | | | ← 225 |
| 220 | 221 | 223 | 224 | | | | | | | | ← 225 |
| 218 | 220 | 221 | 224 | | | | | | | | ← 225 |
| 220 | 221 | 223 | 224 | | | | | | | | ← 225 |
| 218 | 220 | 221 | 224 | | | | | | | | ← 225 |
| 220 | 221 | 223 | 224 | | | | | | | | ← 225 |
| 218 | 220 | 222 | 224 | | | | | | | | ← 225 |
| 220 | 221 | 224 | | | | | | | | | ← 225 |
| 221 | 224 | | | | | | | | | | ← 225 |
| 224 | | | | | | | | | | | ← 225 |
| | | | | | | | | | | | ← 225 |
| ← 225 | 224 | 223 | 224 | 223 | 224 | 223 | 224 | 223 | 224 | 223 | ← 225 |
| 225 | 224 | 223 | 222 | 223 | 222 | 223 | 222 | 223 | 222 | 223 | 222 | 223 | 224 |
| 224 | 223 | 222 | 221 | 222 | 221 | 222 | 221 | 222 | 221 | 222 | 221 | 222 | 223 |
| 223 | 222 | 221 | 220 | 221 | 220 | 221 | 220 | 221 | 220 | 221 | 220 | 221 | 222 |
| 222 | | | | | | | | | | | ← 219 |
| | | | | | | | | | | ← 219 | 220 |
| | | | | | | | | | | ← 219 | 221 |

DR4 ← → DR1
↓
DR2

FIG. 12
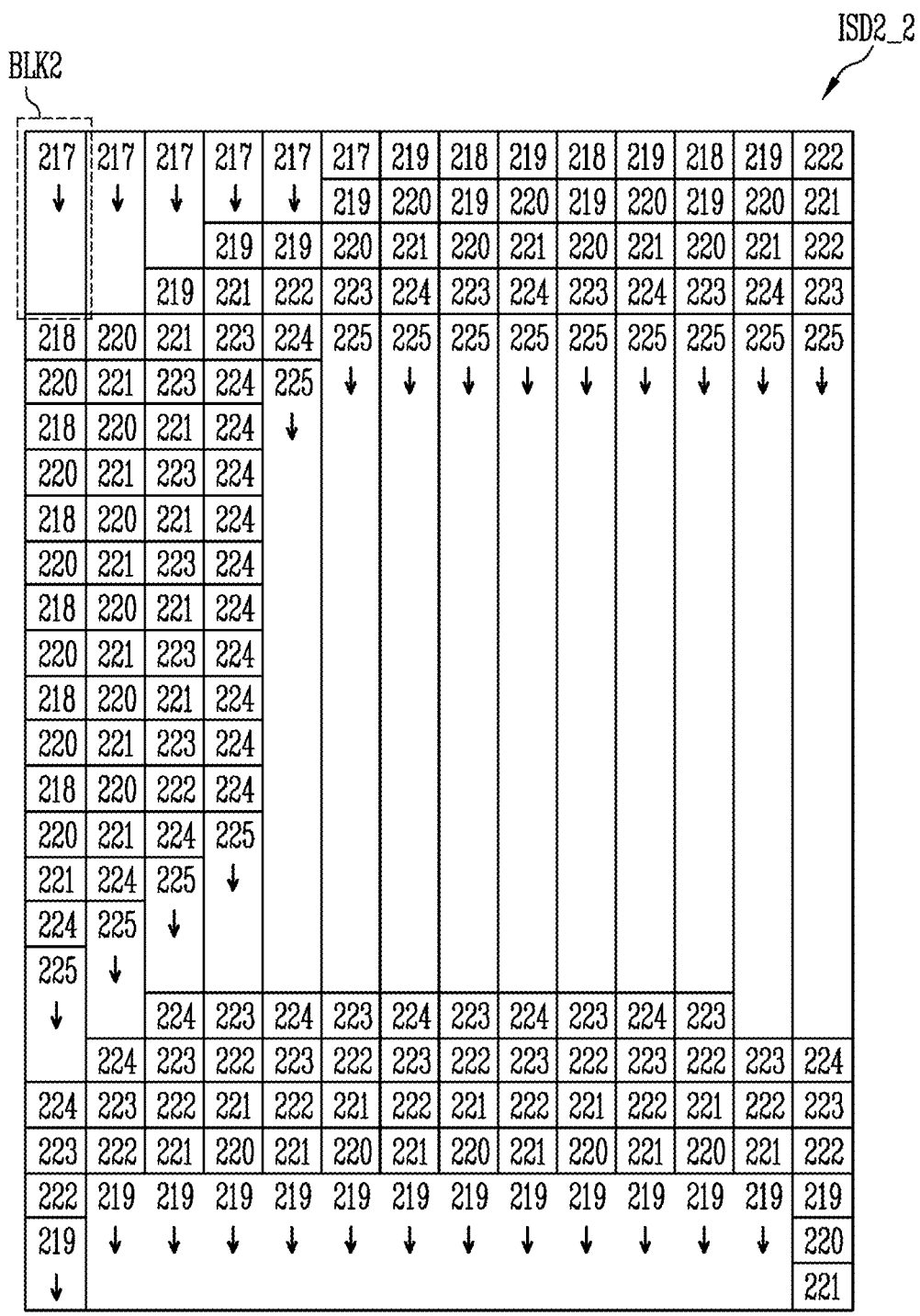
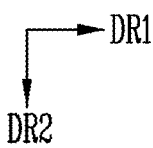

STAIN COMPENSATION METHOD USING SCREEN CALIBRATION SYSTEM

This application claims priority to Korean patent application No. 10-2019-0102542, filed on Aug. 21, 2019, and all the benefits accruing therefrom under 35 U.S.C. § 119, the content of which in its entirety is herein incorporated by reference.

BACKGROUND

1. Field

Various example embodiments of the invention relate to a stain compensation method using a screen calibration system.

2. Description of the Related Art

As a recent image display device, a flat panel display device, such as a liquid crystal display ("LCD") device, a plasma display panel ("PDP") device, or an organic light-emitting display device based on an organic light-emitting diode ("OLED"), is chiefly used.

In an organic light-emitting display device, each pixel includes a plurality of transistors, a storage capacitor, and the OLED. A difference may occur between the luminance values of pixels due to deviation between pixels (e.g., distributions of threshold voltages of driving transistors), and such a luminance difference may be perceived as stain. In order to correct such stain, research into various stain compensation algorithms has been conducted.

SUMMARY

Recently, a compensation parameter has been generated by equally dividing a display area into regions having the same area, and thus the display area has been corrected. However, when the same memory as an existing memory is used even when the size of a display area is increased, a unit area by which division is to be performed may be increased, and thus a compensation effect is decreased. When the unit area is decreased, far more memories than previously used memories are desired, for example.

Various example embodiments of the invention are directed to a stain compensation method, which may increase a compensation effect while reducing the use of memory resources.

Example embodiments of the invention are not limited to the above-described objects, and other objects, not described here, may be clearly understood by those skilled in the art from the following description.

An example embodiment of the invention provides a stain compensation method using a screen calibration system. The stain compensation method includes generating first parameter data including a plurality of first data blocks, each of the plurality of first data blocks defined by at least one emission area, by photographing a display surface, generating second parameter data including second data blocks, the second data blocks being generated by merging first data blocks that are adjacent to each other in one direction and have an identical average grayscale value among the plurality of first data blocks, and storing the second parameter data in a memory.

In an example embodiment, the second data blocks may include data blocks having different sizes from each other.

In an example embodiment, the second data blocks may include different numbers of emission areas depending on sizes of the second data blocks.

In an example embodiment, sizes of the plurality of first data blocks or numbers of emission areas included in the plurality of first data blocks may be identical to each other.

In an example embodiment, the first data blocks and the emission areas may be arranged in a matrix form.

In an example embodiment, the emission areas included in each of the plurality of first data blocks may be arranged in an M*M matrix form, where M is a natural number.

In an example embodiment, at least one of the second data blocks may include emission areas arranged in an M*N matrix form, where N is a natural number greater than M.

In an example embodiment, when average grayscale values of the first data blocks adjacent to each other in the one direction are different from each other, generating the second parameter data may not merge the corresponding first data blocks.

In an example embodiment, the one direction may be a first direction, and generating the second parameter data may merge the first data blocks that are adjacent to each other in the first direction and a second direction different from the first direction and have an identical average grayscale value.

In an example embodiment, the first direction and the second direction may be directions orthogonal to each other.

In an example embodiment, each of the plurality of first data blocks may include a diamond shape.

In an example embodiment, the first parameter data may include a first sub-parameter including the plurality of first data blocks, and a second sub-parameter including third data blocks having a size different from that of the first data blocks.

In an example embodiment, generating the second parameter data may generate fourth data blocks by merging third data blocks that are adjacent to each other in the one direction and have an identical grayscale value.

In an example embodiment, the second sub-parameter may enclose the first sub-parameter.

In an example embodiment, a number of emission areas included in each of the third data blocks may be less than a number of emission areas included in each of the first data blocks.

In an example embodiment, the first parameter data may further include a third sub-parameter on which respective operations for stain compensation are not performed at generating the second parameter data.

In an example embodiment, the screen calibration system may include a head-mounted display ("HMD") device including the display surface, and a monochrome camera which photographs the display surface of the HMD device.

In an example embodiment, image data on which stain compensation is performed may be generated based on the second parameter data.

In an example embodiment, the second parameter data may include stain compensation address information.

In an example embodiment, the average grayscale values of the plurality of first data blocks may be selected from among values from 0 to 225.

Other details of embodiments will be described with reference to the following descriptions and drawings.

BRIEF DESCRIPTION OF THE DRAWINGS

The above and other example embodiments, advantages and features of this disclosure will become more apparent by describing in further detail example embodiments thereof with reference to the accompanying drawings, in which:

FIG. 6 is a diagram illustrating reference parameter data of FIG. 5.

FIGS. 11 to 13 illustrate modifications of FIG. 10.

DETAILED DESCRIPTION

Figure 1:
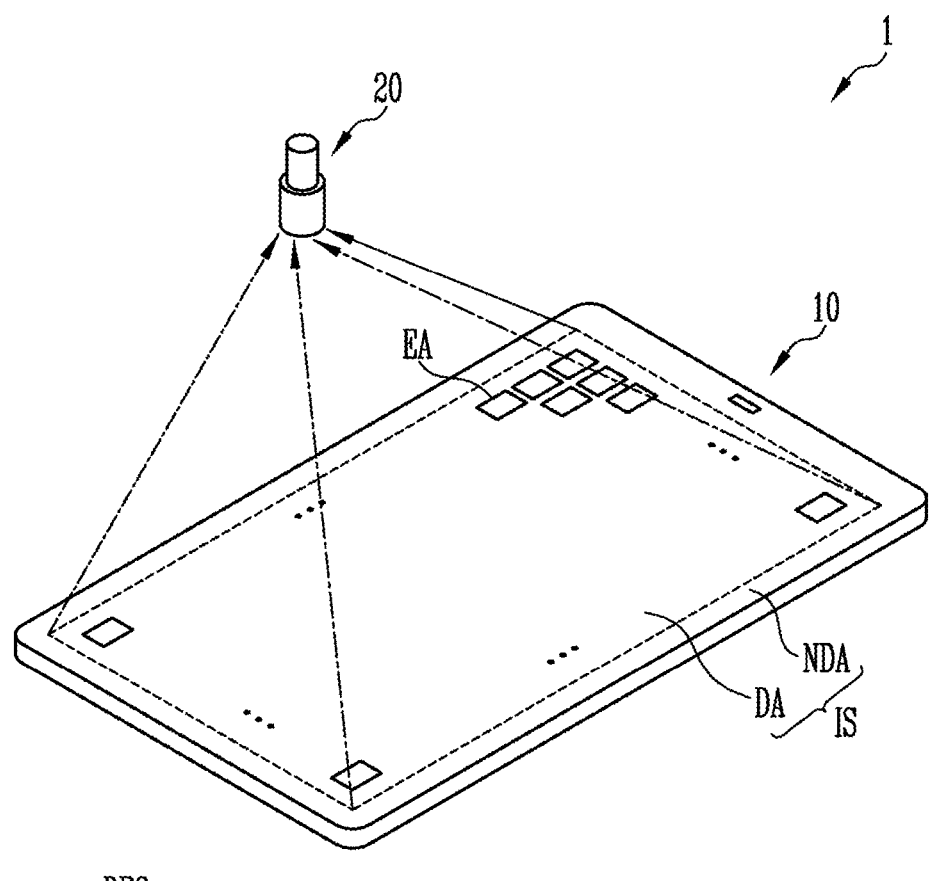
FIG. 1 is a perspective view illustrating an example embodiment of a screen calibration system according to the invention.

Advantages and features of the invention, and methods for achieving the same will be cleared with reference to embodiments described later in detail together with the accompanying drawings. However, the invention may be implemented in various forms rather than being limited by the following embodiments. These embodiments are provided so that this invention will be thorough and complete, and will fully convey the scope of the example embodiments to those skilled in the art. The scope of the invention should be defined by the accompanying claims.

Although the terms "first" and "second" are used to describe various components, but it is apparent that those components are not limited by the terms. These terms are merely used to distinguish one component from another component. Therefore, it is apparent that a first component, which will be described below, may also be a second component without departing from the technical spirit of the invention. In the invention, the singular forms are intended to include the plural forms as well, unless the context clearly indicates otherwise.

Hereinafter, embodiments of the invention will be described with reference to the attached drawings. The same or similar reference numerals are used to designate the same components throughout the drawings.

It will be understood that when an element is referred to as being "on" another element, it can be directly on the other element or intervening elements may be therebetween. In contrast, when an element is referred to as being "directly on" another element, there are no intervening elements present.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an example embodiment, when the device in one of the figures is turned over, elements described as being on the "lower" side of other elements would then be oriented on "upper" sides of the other elements. The example term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The example terms "below" or "beneath" can, therefore, encompass both an orientation of above and below.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Example embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an example embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims FIG. 1 is a perspective view illustrating an example embodiment of a screen calibration system according to the invention.

Referring to FIG. 1, a screen calibration system 1 may include a display device 10 and a stain detection device 20.

The display device 10 may display an image on a display surface IS. The illustrated example embodiment is described using a smartphone as an example embodiment of the display device 10. However, when the display device 10 is an electronic device having one surface to which a display surface IS is applied, such as a television, a tablet personal computer ("PC"), a mobile phone, a video phone, an electronic book ("e-book") reader, a desktop PC, a laptop PC, a Netbook computer, a workstation, a server, a personal digital assistant ("PDA"), a portable multimedia player ("PMP"), an MP3 player, a medical device, a camera or a wearable device, the invention may be applied to the display device 10.

In an example embodiment, the display device 10 may be an organic light-emitting display device. However, the display device 10 is not limited thereto, and display devices, such as a quantum-dot OLED display device, a liquid crystal display ("LCD") device, a micro-LED display device, a plasma display device, an electrophoretic display device, a micro electromechanical system ("MEMS") display device, and an electrowetting display device, may be used as the display device 10 unless the spirit of the invention is changed.

A display direction may be defined as the direction of a normal line of the display surface IS. The display surface IS in the drawing is a surface placed on a front surface of the display device, and is illustrated as having the shape of a plane defined by a first direction DR1 and a second direction DR2 intersecting the first direction DR1. Also, the display direction is illustrated as being a third direction DR3. The thickness direction of the display device may be defined as the third direction DR3. However, this is merely example, and the display device 10 in other example embodiments may be implemented to have a shape in which the display surface IS is curved, where the display direction may have various directions. Here, directions indicated by the first to third directions DR1, DR2 and DR3 are relative concepts of directions, and may be changed to other directions. The first to third directions DR1, DR2, and DR3 may be directions respectively indicated by the first to third directions DR, DR2, and DR3, which are designated by the same reference numerals. Hereinafter, embodiments will be described on the assumption that the first to third directions DR1, DR2, and DR3 are orthogonal to each other.

The display surface IS may include a display area DA in which an image is displayed and a non-display area NDA adjacent to the display area DA. The display area DA may be defined by individual pixels, and may include a plurality of emission areas EA that are areas in which light components having respective designated colors are emitted.

The non-display area NDA is an area in which an image is not displayed. In the non-display area NDA, a sensor, a camera, etc. may be disposed (e.g., mounted). The display area DA may have a rectangular shape. The non-display area NDA may be disposed to enclose the display area DA in the plan view. However, the invention is not limited thereto, and the shapes of the display area DA and the non-display area NDA may be relatively designed.

The display area DA may include the plurality of emission areas EA that are distinguished from each other. Each emission area EA is defined as an area in which light is transmitted and perceived by a user in the display area DA. In each emission area EA, pixels may be arranged. In an example embodiment, the emission areas EA may be arranged in a matrix form.

In one emission area EA, light corresponding to any one grayscale value, among displayable grayscale values, may be emitted. In an example embodiment, the grayscale value may be one of grayscale values from 0 to 225 based on a red pattern, a green pattern, a blue pattern, a mixed color pattern thereof, or a gray pattern, for example. Hereinafter, a case where the emission area EA has any one of grayscale values from 0 to 225 based on the gray pattern is described as an example, but the invention is not limited thereto. Also, one emission area EA may emit light in a specific color for any one grayscale value.

A set of at least one emission area EA may define a data block, which will be described later. This will be described later with reference to FIG. 7 or the like.

The stain detection device 20 may be disposed in front of the display device 10 (i.e., disposed to face the display surface IS), and may photograph an image displayed in the display area DA through an image photographing means, generate stain-compensating data through the photographed display data, and provide the generated stain-compensating data to a memory (not illustrated) of the display device. Such an image photographing means may be implemented as a digital camera or an image sensor. In an example embodiment, the image photographing means may be implemented as a monochrome camera, for example.

Figure 3:
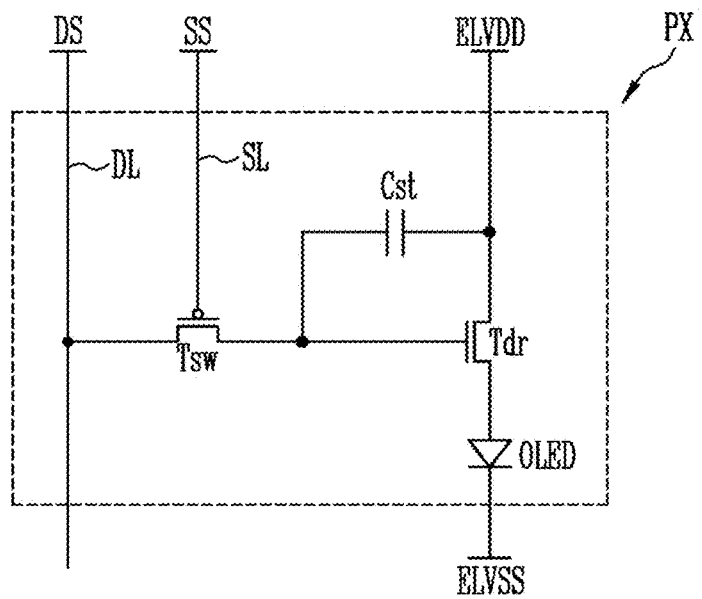
FIG. 3 is a circuit diagram illustrating a pixel of FIG. 2.
Figure 4:
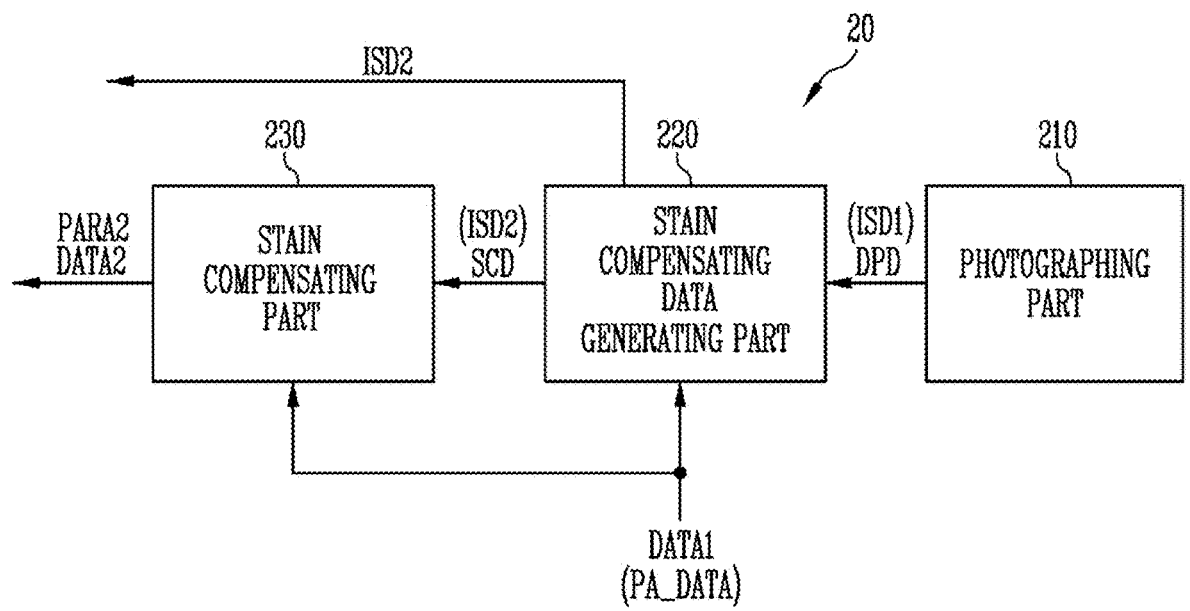
FIG. 4 is a block diagram illustrating a stain detection device of FIG. 2.

Below, individual components of the screen calibration system 1 will be described in detail with reference to FIGS. 2 to 4 together.

Figure 2:
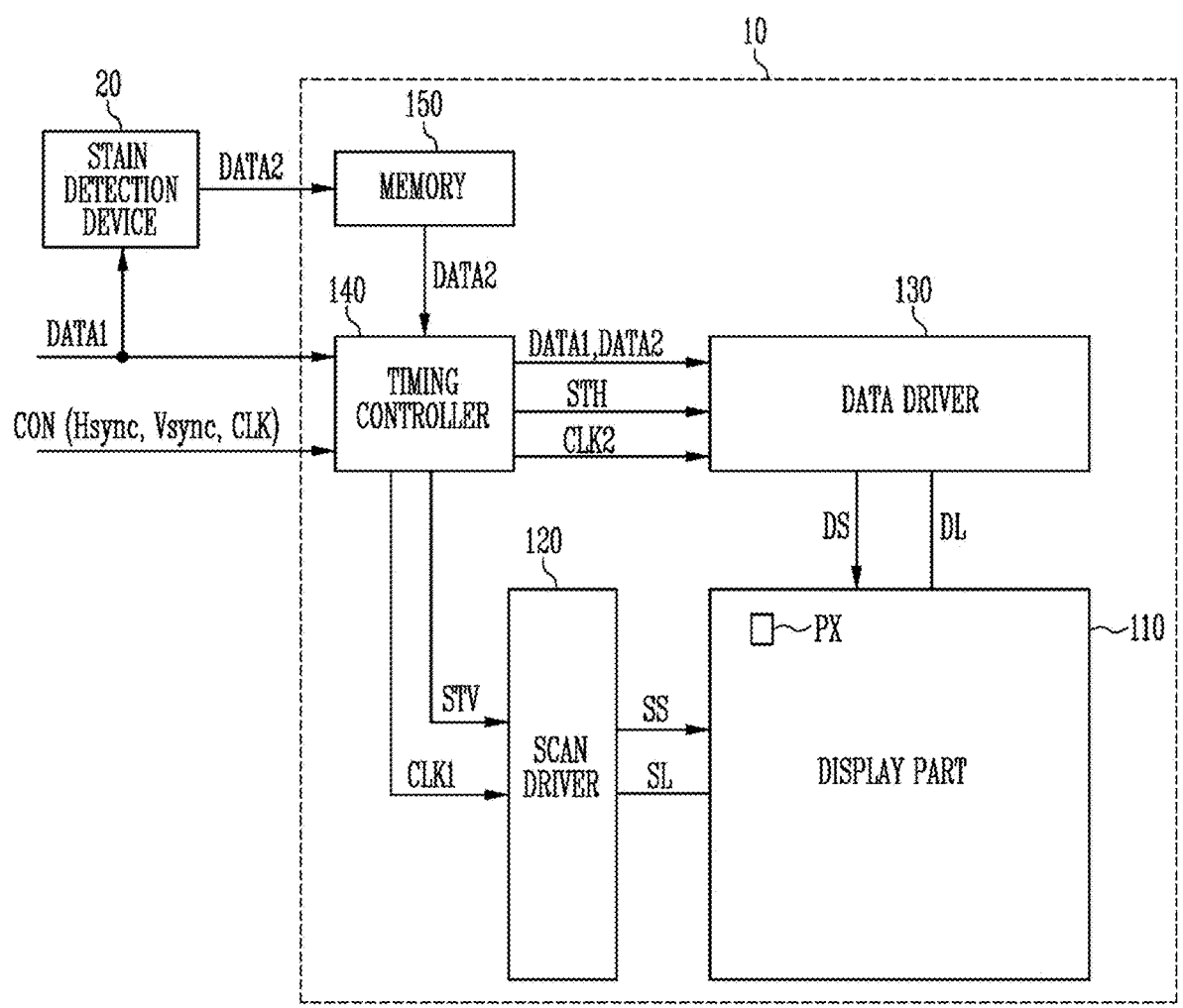
FIG. 2 is a block diagram illustrating an example embodiment of a screen calibration system according to the invention.

FIG. 2 is a block diagram illustrating an example embodiment of a screen calibration system according to the invention. FIG. 3 is a circuit diagram illustrating a pixel of FIG. 2. FIG. 4 is a block diagram illustrating a stain detection device of FIG. 2.

A display device 10 includes a display part 110, a scan driver 120, a data driver 130, a timing controller 140, and a memory 150.

The display part 110 receives a data signal DS based on first image data DATA1 provided from the timing controller 140 and then displays an image. The display part 110 may include a plurality of pixels PX. In an example embodiment, the pixels PX in the display part 110 may be arranged in a matrix form in accordance with an array form of emission areas EA (refer to FIG. 1).

In an example embodiment, each pixel PX may include a switching transistor Tsw, a storage capacitor Cst, a driving transistor Tdr, and an organic light-emitting diode OLED.

The switching transistor Tsw may include a first electrode coupled to a data line DL to receive the data signal DS, a second electrode coupled to the storage capacitor Cst, and a gate electrode coupled to a scan line SL to receive a scan signal SS. The switching transistor Tsw may transmit the data signal DS provided from the data driver 130 to the storage capacitor Cst in response to the scan signal SS applied from the scan driver 120.

The storage capacitor Cst may include a first electrode coupled to a high supply voltage source ELVDD and a second electrode coupled to the gate electrode of the driving transistor Tdr. The storage capacitor Cst may store the voltage of the data signal DS transmitted through the switching transistor Tsw.

The driving transistor Tdr may include a first electrode coupled to the high supply voltage source ELVDD, a second electrode coupled to the OLED, and a gate electrode coupled to the storage capacitor Cst. The driving transistor Tdr may be turned on or off in response to the data signal DS stored in the storage capacitor Cst.

The OLED may have an anode electrode coupled to the driving transistor Tdr and a cathode electrode coupled to a low supply voltage source ELVSS. The OLED may emit light based on a current flowing from the high supply voltage source ELVDD to the low supply voltage source ELVSS while the driving transistor Tdr is turned on.

The scan driver 120 outputs the scan signal SS to the scan line SL in response to a vertical start pulse signal STV provided from the timing controller 140 and a first clock signal CLK1.

The timing controller 140 receives first image data DATA1, second image data DATA2, and a control signal CON from an external device. In an example embodiment, the external device may be an electronic part, such as an application processor, for example. The timing controller 140 may output the first image data DATA1 and the second image data DATA2 to the data driver 130.

The timing controller 140 may output the control signal CON for controlling the operation timing of the scan driver 120 and the data driver 130 based on driving timing information stored in the memory 150.

The control signal CON may include a horizontal synchronization signal Hsync, a vertical synchronization signal Vsync, and the clock signal CLK. The timing controller 140 generates a horizontal start pulse signal STH using the horizontal synchronization signal Hsync, and then outputs the horizontal start pulse signal STH to the data driver 130. Also, the timing controller 140 generates a vertical start pulse signal STV using the vertical synchronization signal Vsync, and then outputs the vertical start pulse signal STV to the scan driver 120. Further, the timing controller 140 may generate a first clock signal CLK1 and a second clock signal CLK2 using the clock signal CLK, and may then output the first clock signal CLK1 to the scan driver 120 and output the second clock signal CLK2 to the data driver 130.

In an example embodiment, the memory 150 may be disposed (e.g., mounted) in a chip-mounting area (not illustrated) in the display device 10 using a chip on glass ("COG") or a chip on plastic ("COP") method, for example. The memory 150 may control the timing controller 140. The memory 150 may provide stain compensation address information for compensating for stain to the timing controller 140. Here, the address information may be included in parameter data, which will be described later. The memory 150 may provide the stain-compensated second image data DATA2 to the timing controller 140.

The stain detection device 20 may include a photographing part 210, a stain compensating data generating part 220, and a stain compensating part 230. The stain detection device 20 compensates for stain in an image displayed on the display device 10, and then outputs the second image data DATA2. Therefore, the stain detection device 20 outputs the second image data DATA2 by performing stain compensation on the first image data DATA1. The stain detection device 20 may output the second image data DATA2 to the memory 150 and the timing controller 140. In this case, the timing controller 140 may output the second image data DATA2 to the data driver 130, and the data driver 130 may generate the data signal DS based on the second image data DATA2.

The photographing part 210 photographs an image displayed on the display device 10, and then outputs panel data DPD. The photographing part 210 may be provided in the form of the above-described image-photographing means.

The stain compensating data generating part 220 generates and outputs stain-compensating data SCD based on the display panel data DPD and the first image data DATA1.

The photographing part 210 may generate first parameter data ISD1 that is defined by a plurality of first data blocks, each having a size designated to include at least one emission area EA, based on the display panel data DPD. This operation will be described later.

The stain compensating part 230 may generate the second image data DATA2 in which the stain-compensating data SCD is reflected, and may provide the second image data DATA2 to the timing controller 140. The stain compensating part 230 may use second parameter data ISD2 as address information of the second image data DATA2.

Next, a stain compensation method using the screen calibration system 1 in an example embodiment will be described with reference to FIGS. 5 to 10 together.

Figure 5:
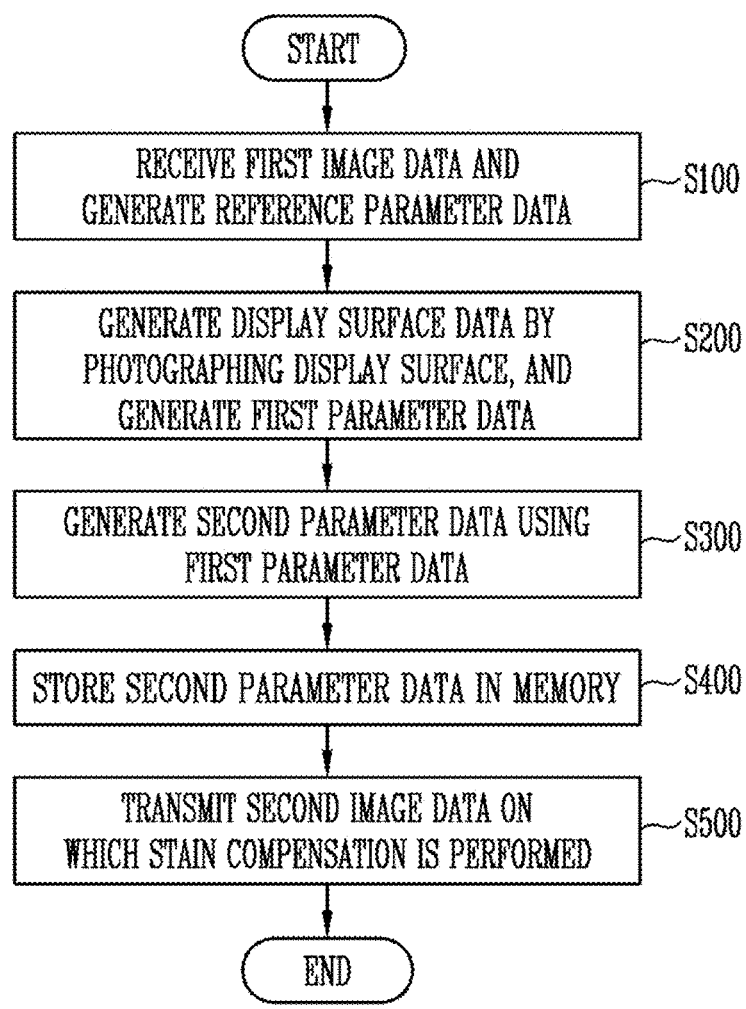
FIG. 5 is a flowchart illustrating an example embodiment of a stain compensation method using a screen calibration system according to the invention.
Figure 6:
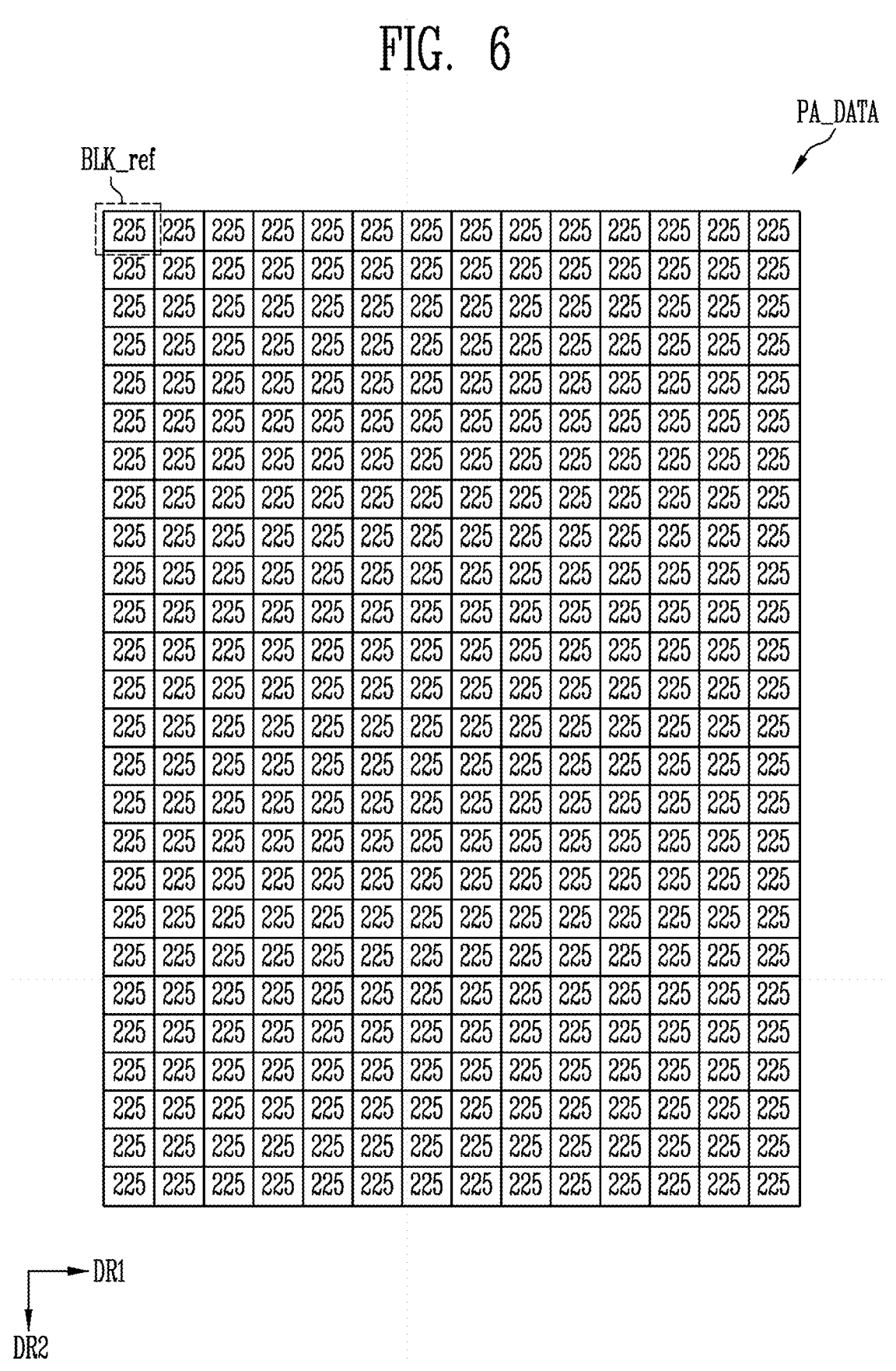
Figure 7:
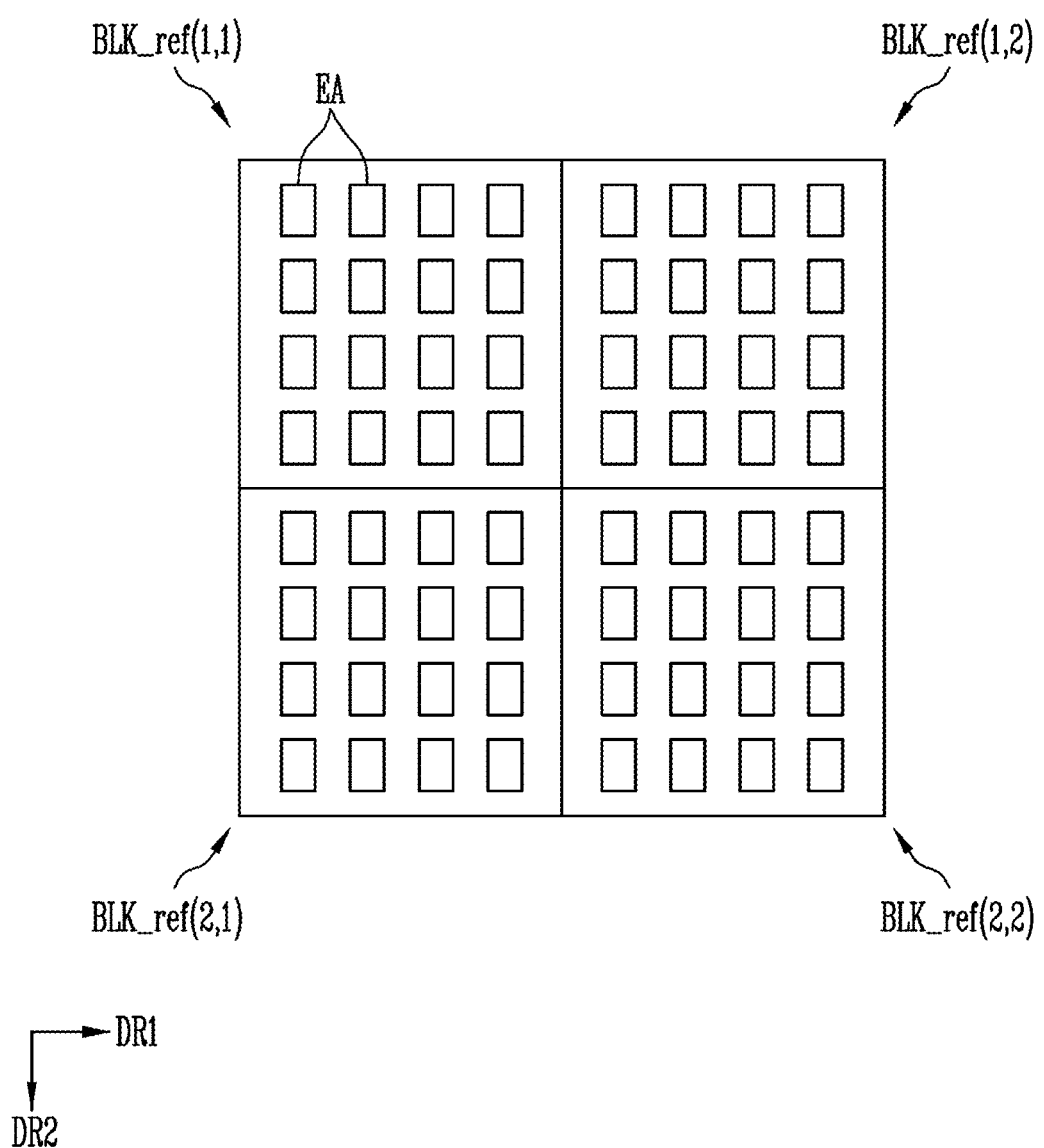
FIG. 7 is a diagram illustrating four reference data blocks of FIG. 6.
Figure 8:
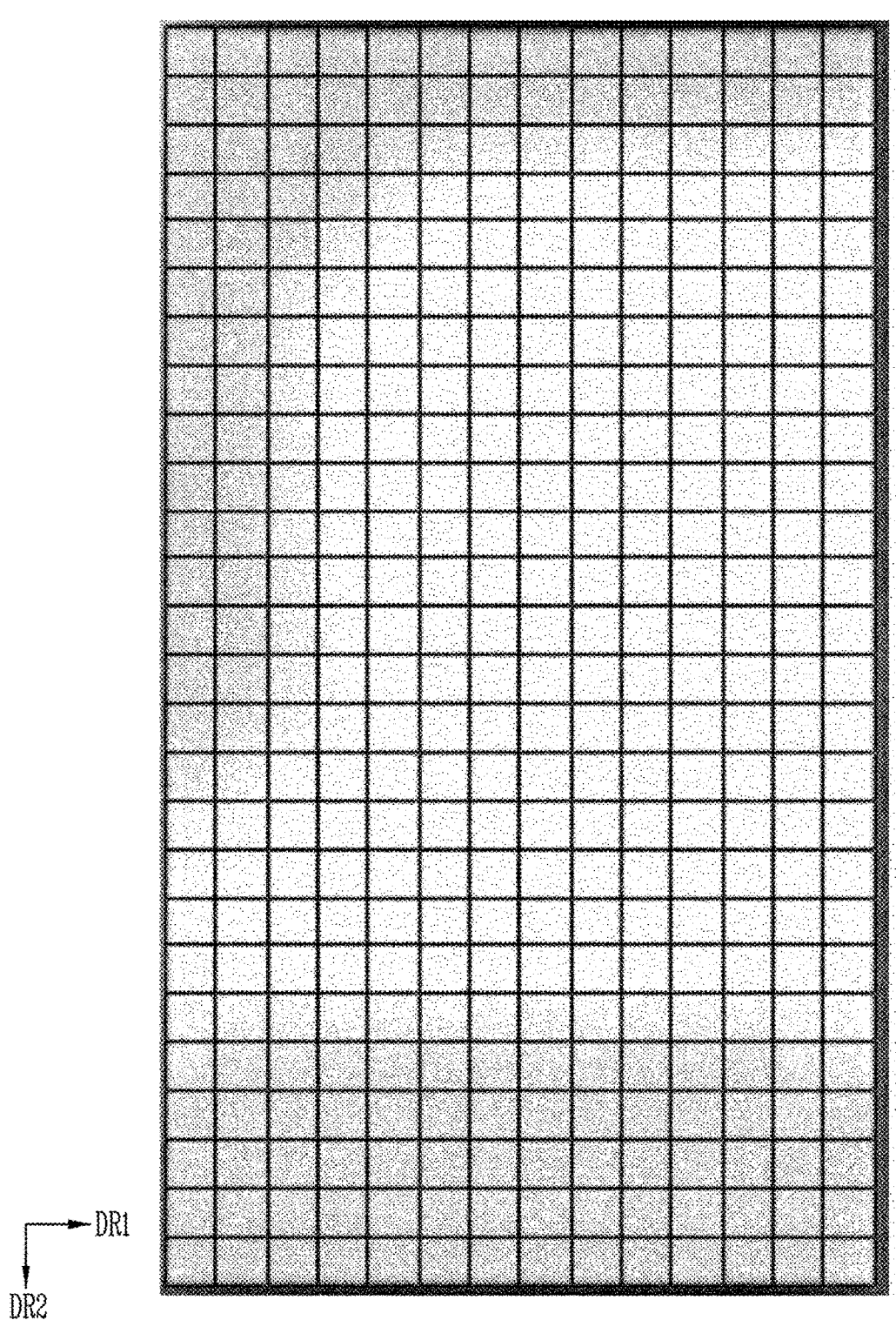
FIG. 8 is a diagram illustrating an image obtained by photographing a display surface before stain compensation.
Figure 9:
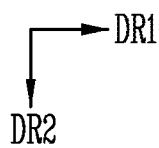
FIG. 9 is a diagram illustrating first parameter data of FIG. 8.
Figure 10:
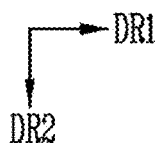
FIG. 10 is a diagram illustrating second parameter data of FIG. 5.
Figure 13:
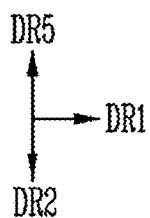

FIG. 5 is a flowchart illustrating an example embodiment of a stain compensation method using a screen calibration system according to the invention. FIG. 6 is a diagram illustrating reference parameter data of FIG. 5. FIG. 7 is a diagram illustrating four reference data blocks of FIG. 6. FIG. 8 is a diagram illustrating an image obtained by photographing a display surface before stain compensation. FIG. 9 is a diagram illustrating first parameter data of FIG. 8. FIG. 10 is a diagram illustrating second parameter data of FIG. 5. FIGS. 11 to 13 are modifications of FIG. 10.

Referring to FIGS. 5 to 10, the stain compensation method using the screen calibration system 1 may include the operation S100 of receiving first image data and generating reference parameter data, the operation S200 of generating display surface data and generating first parameter data, the operation S300 of generating second parameter data, the operation S400 of storing the second parameter data in the memory 150, and the operation S500 of transmitting second image data.

In the specification, a description is made on the assumption that individual operations are sequentially performed based on the flowchart, but it is apparent that some operations illustrated as being successively performed may be simultaneously performed, the sequence of individual operations may be changed, some operations may be omitted, or additional operations may be included between respective operations unless the spirit of the invention is changed.

First, the operation S100 of receiving the first image data and generating the reference parameter data may correspond to the operation where the stain detection device 20 receives first image data DATA1 from an external device and generates reference parameter data PA_DATA based on the first image data DATA1.

The reference parameter data PA_DATA may include data that is a reference for address information desired for stain compensation.

In an example embodiment, the reference parameter data PA_DATA may be a set of data blocks. In the specification, data blocks constituting the reference parameter data PA_DATA may be designated as "reference data blocks BLK_ref".

In an example embodiment, the reference parameter data PA_DATA may include reference data blocks BLK_ref arranged in a J*K matrix (where each of J and K is a natural number). Each reference data block BLK_ref may correspond to the array form of the emission areas EA. In an example embodiment, each reference data block BLK_ref may have a rectangular shape, for example. Also, the sizes of respective reference data blocks BLK_ref may be equal to each other. Although, in FIG. 6, the reference parameter data PA_DATA is exemplified as being arranged in a matrix form of 26 rows and 14 columns and having a size of 364 equal reference data blocks BLK_ref, the reference parameter data is not limited thereto.

Each reference data block BLK_ref includes at least one emission area EA. In an example embodiment, the emission areas EA included in respective reference data blocks BLK_ref may have the same number of rows and the same number of columns. In an example embodiment, the emission areas EA included in each reference data block BLK_ref may be arranged in an M*M matrix form (where M is a natural number less than a smaller one of J and K), for example.

Example reference data blocks in the reference parameter data of FIG. 7, that is, all of a reference data block BLK_ref (1, 1) in a first row and a first column, a reference data block BLK_ref(1, 2) in a first row and a second column, a reference data block BLK_ref(2, 1) in a second row and a first column, and a reference data block BLK_ref(2, 2) in a second row and a second column may include 16 emission areas EA arranged in a 4*4 matrix form. That is, 16 emission areas EA may be included in one reference data block BLK_ref. However, the array form and number of reference data blocks BLK_ref in the reference parameter data PA_DATA and in the array form and number of emission areas EA included in each reference data block BLK_ref are not limited by the example embodiment.

In an example embodiment, the first image data DATA1 may include data indicating reference grayscale values for respective pixels (for respective emission areas EA), for example. The stain detection device 20 may designate the shape of reference data blocks BLK_ref and the shape of the reference parameter data PA_DATA in conformity with the array form of pixels using the received first image data DATA1.

The stain detection device 20 may generate data about the average reference grayscale value of emission areas EA included in each reference data block BLK_ref using data about reference grayscale values of the emission areas EA included in the first image data DATA1. In an example embodiment, as illustrated in FIG. 6, all of reference data blocks BLK_ref arranged in a matrix form of 26 rows and 14 columns in the reference parameter data PA_DATA generated by the stain detection device 20 may be designated to have an average reference grayscale value of 225, which is a full-white grayscale value, for example.

Next, the operation S200 of generating the display surface data and generating the first parameter data may correspond to the operation where the photographing part 210 generates display surface data IS_picture by photographing the display surface IS and generates first parameter data ISD1 using the display surface data IS_picture. In an example embodiment, the display surface data IS_picture may be included in the above-described display panel data DPD.

The photographing part 210 may generate the display surface data IS_picture by photographing an image displayed on the display surface IS of the display device 10. The display surface data IS_picture may include output grayscale value data generated by recognizing grayscale values output from respective emission areas EA.

The stain detection device 20 may generate the first parameter data ISD1 and first data blocks BLK1 which correspond to the sizes and shapes of the reference parameter data PA_DATA and the reference data blocks BLK_ref, respectively, using the display surface data IS_picture. Similar to the reference parameter data PA_DATA and the reference data blocks BLK_ref, the first parameter data ISD1 may include first data blocks BLK1 arranged in a J*K matrix, and each first data block BLK1 may include emission areas EA arranged in an M*M matrix form. In an example embodiment, as illustrated in FIG. 9, the first parameter data ISD1 may have 346 first data blocks BLK1 that are arranged in a matrix form of 26 rows and 14 columns in the same manner as the reference parameter data PA_DATA and that have the same size, for example. However, the average grayscale values of the first data blocks BLK1 may differ from the average grayscale values of the reference data blocks BLK_ref at the corresponding locations.

Next, the operation S300 of generating the second parameter data may correspond to the operation where the stain detection device 20 generates the second parameter data ISD2 by deforming the first parameter data ISD1.

In an example embodiment, the stain detection device 20 may generate the second parameter data ISD2 that includes second data blocks BLK2 generated by merging at least some of the first data blocks BLK1 of the first parameter data ISD1.

In an example embodiment, the second data blocks BLK2 may include emission areas EA arranged in an M*N matrix form (where N is a natural number that is equal to or greater than M and is less than a smaller one of J and K). The second data blocks BLK2 may be generated using a scheme in which, among first data blocks BLK1 arranged adjacent to each other, the first data blocks BLK1 having the same average grayscale value in a first direction DR1 are merged with each other, and in which the first data blocks BLK1 having different average grayscale values in the first direction DR1 are not merged with each other. Accordingly, the second parameter data ISD2 may include second data blocks BLK2 having different sizes. Here, although the first direction DR1 is exemplified as being a rightward direction in the drawing, the first direction DR1 is not limited thereto.

In an example embodiment, as illustrated in FIGS. 9 and 10, it is assumed that the first data blocks BLK1 ranging from a first data block in a first row and a first column to a first data block in a first row and a sixth column, which are adjacent to each other in the first direction DR1 in the parameter data ISD1, have an average grayscale value of 217, a first data block BLK1 in a first row and a seventh column has an average grayscale value of 219, and a first data block in a first row and an eighth column has an average grayscale value of 218, for example. Then, the first data block BLK1 in the first row and the first column to the first data block BLK1 in the first row and the sixth column, which have the same average grayscale value in the first direction DR1, may be merged with each other to generate a single second data block BLK2, as illustrated in FIG. 10. Also, the first data block BLK1 in the first row and the seventh column and the first data block BLK1 in the first row and the eighth column, which have different average grayscale values in the first direction DR1, may not be merged with each other, and thus different second data blocks BLK2 may be generated.

This scheme may be applied to each row, and second parameter data ISD2 including the second data blocks BLK2 having various sizes may be generated. Based on the above-described scheme, the number of second data blocks BLK2 included in the second parameter data ISD2 may be less than or equal to the number of first data blocks BLK1 included in the first parameter data ISD1.

The single second data block BLK2 generated by merging the first data blocks BLK1 ranging from the first data block BLK1 in the first row and the first column to the first data block BLK1 in the first row and the sixth column may use less resources than those in a case where an existing second data block is composed of six first data blocks BLK1. Therefore, in a case where the second parameter data ISD2 composed of a relatively small number of second data blocks BLK2 is stored in the memory 150, less resources than those in a case where the first parameter data ISD1 is stored in the memory 150 may be used.

In some other example embodiments, the operation S300 of generating the second parameter data ISD2 is not limited to a configuration in which the first data blocks are merged or not merged based on the above-described adjacency in the first direction DR1.

As illustrated in FIG. 11, second parameter data ISD2_1 may be generated using a scheme in which first data blocks having the same average grayscale value in a fourth direction DR4 opposite the first direction DR1, among the first data blocks arranged adjacent to each other, are merged with each other and in which first data blocks having different average grayscale values in the first direction DR4 are not merged with each other.

In an example embodiment, it is assumed that a first data block BLK1 in a fifth row and a 14-th column to a first data block BLK1 in a fifth row and a sixth column, which are adjacent to each other in the fourth direction DR4 in the first parameter data ISD1, have an average grayscale value of 225 and that a first data block BLK1 in a fifth row and a fifth column has an average grayscale value of 224 and a first data block BLK1 in a fifth row and a fourth column has an average grayscale value of 223, for example. In this case, the second data blocks BLK2 may be generated using a scheme in which the first data block BLK1 in the fifth row and the 14-th column to the first data block BLK1 in the fifth row and the sixth column, which have the same average grayscale value in the fourth direction DR4, are merged with each other, and in which the first data block BLK1 in the fifth row and the fifth column and the first data block BLK1 in the fifth row and the fourth column, which have different average grayscale values in the fourth direction DR4, are not merged with each other. This scheme may be applied to each row.

As illustrated in FIG. 12, second parameter data ISD2_2 may be generated in such a way as to merge first data blocks having the same average grayscale value in the second direction DR2, among the first data blocks arranged adjacent to each other, and not to merge first data blocks having different average grayscale values in the second direction DR2.

In an example embodiment, it is assumed that first data blocks BLK1 ranging from a first data block BLK1 in a first row and a first column to a first data block BLK1 in a fourth row and a first column, which are adjacent to each other in the second direction DR2 in the first parameter data ISD1, have an average grayscale value of 217, that first data blocks BLK1 ranging from a first data block BLK1 in a fifth row and a first column to a first data block BLK1 in an 18-th row and a first column have different average grayscale values of 218 to 224 between adjacent first data blocks, that a first data block BLK1 in a 19-th row and a first column to a first data block in a 21-st row and a first column have an average grayscale values of 225, and that first data blocks BLK1 ranging from a first data block BLK1 in a 22-nd row and a first column to a first data block BLK1 in a 24-th row and a first column have different average grayscale values of 222 to 224, and a first data block BLK1 in a 25-th row and a first column and a first data block BLK1 in a 26-th row and a first column have an average grayscale value of 219, for example. In this case, the second data blocks BLK2 may be generated using a scheme in which the first data block BLK1 in the first row and the first column to the first data block BLK1 in the fourth row and the first column, which have the same average grayscale value in the second direction DR2, are merged with each other, and in which the first data block BLK1 in the 19-th row and the first column to the first data block BLK1 in the 21-st row and the first column, which have the same average grayscale value in the second direction DR2, are merged with each other, and the first data blocks BLK1 in the 25-th row and the first column and in the 26-th row and the first column, which have the same average grayscale value in the second direction DR2, are merged with each other, and in which the remaining first data blocks BLK1, which have different average grayscale value in the second direction DR2, are not merged with each other. This scheme may be applied to each row.

As illustrated in FIG. 13, second parameter data ISD2_3 may be generated in such a way as to merge first data blocks having the same average grayscale value in a fifth direction DR5 opposite the second direction DR2, among the first data blocks arranged adjacent to each other, and not to merge first data blocks having different average grayscale values in the fifth direction DR5.

It may be understood that the first to fifth directions DR1 to DR5 may be directions relative to each other without being limited to those illustrated in the drawings. The numbers of second data blocks BLK2 generated as a result of merging or non-merging based on the first data blocks BLK1 adjacent to each other in the first direction DR1 and the fourth direction DR4, which are row directions, are equal to each other. The numbers of second data blocks BLK2 generated as a result of merging or non-merging based on the first data blocks BLK1 adjacent to each other in the second direction DR2 and the fifth direction DR5, which are column directions, are equal to each other. However, the number of second data blocks BLK2 generated as a result of merging or non-merging based on the row direction may be different from the number of second data blocks BLK2 generated as a result of merging or non-merging based on the column direction. That is, the usage of resources of the memory 150 may differ depending on whether the merging direction of the adjacent first data blocks BLK1 is based on the row direction or the column direction. Therefore, the operation S300 of generating the second parameter data ISD2 may include the operation of determining which one of the row direction and the column direction is to be a reference direction when performing merging or non-merging of the first data blocks BLK1 in the first parameter data ISD1.

Next, the operation S400 of storing the second parameter data in the memory may correspond to the operation where the stain detection device 20 stores the generated second parameter data ISD2 in the memory 150.

The stain compensating data generating part 220 may generate stain-compensating data SCD based on the first image data DATA1. Also, the stain compensating data generating part 220 may transmit the second parameter data ISD2, which is the address information of the second image data DATA2, to the memory 150, and the memory 150 may store the second parameter data ISD2 therein.

Next, the operation S500 of transmitting the second image data may correspond to the operation where the stain detection device 20 transmits the second image data DATA2, generated by performing stain compensation, to the timing controller 140 through the memory 150.

Through the above-described process, a stain compensation effect may be improved, and the amount of resources desired by the memory 150 may be decreased.

Below, a stain compensation method using a screen calibration system in an example embodiment will be described. Hereinafter, repeated descriptions of the same components as those in FIGS. 1 to 10 are omitted, and identical or similar reference numerals are used to designate the same components.

Figure 14:
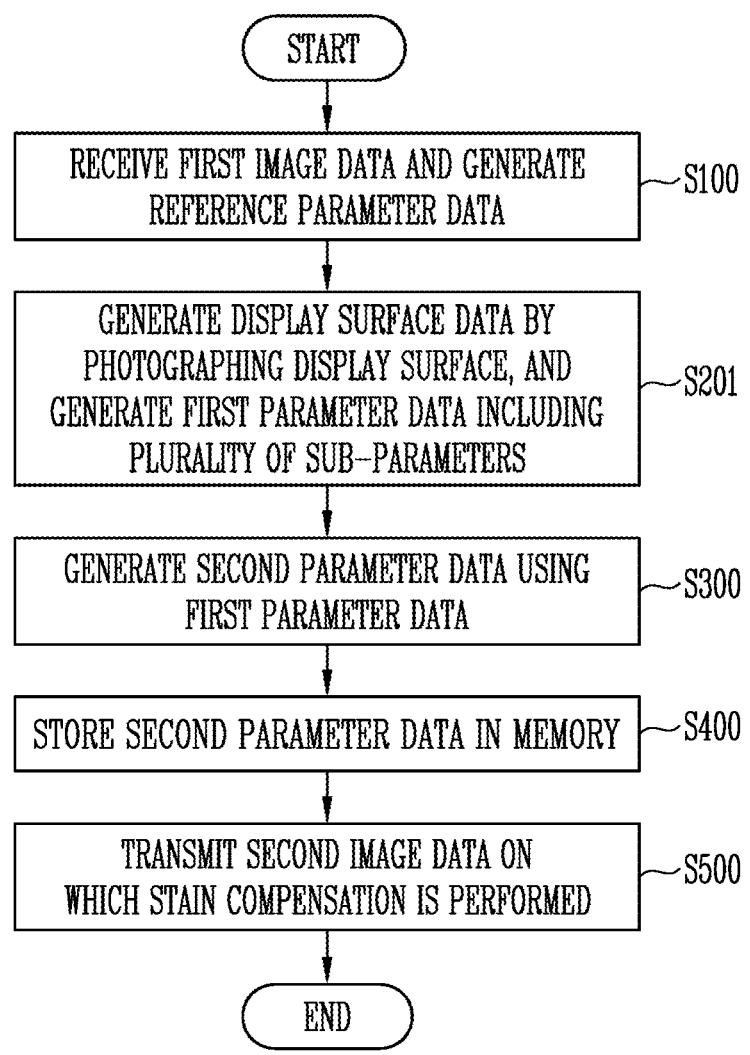
FIG. 14 is a flowchart illustrating an example embodiment of a stain compensation method using a screen calibration system.
Figure 15:
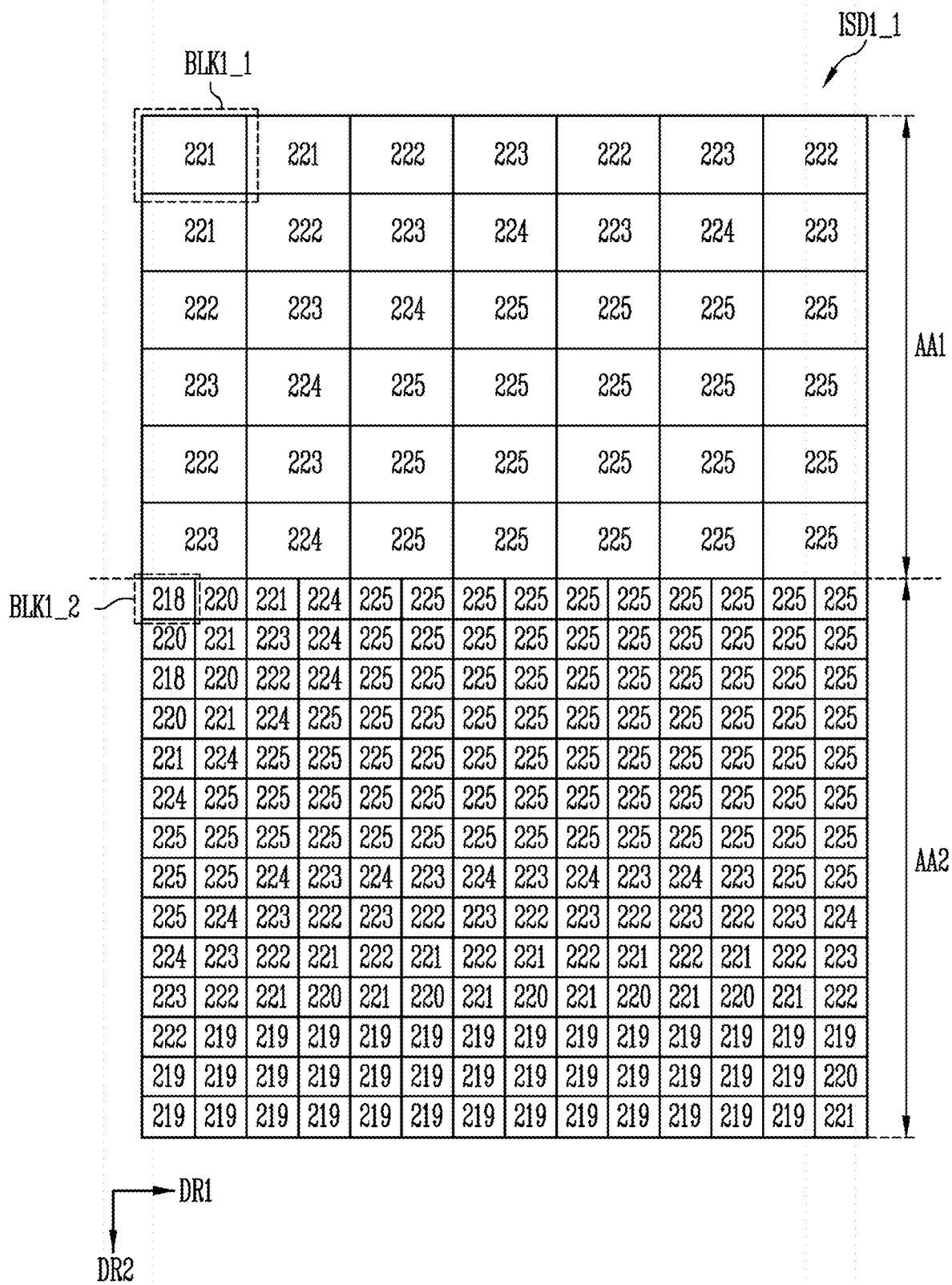
FIGS. 15 and 16 are diagrams illustrating an example embodiment of a process for generating second parameter data in the stain compensation method using the screen calibration system of FIG. 14.
Figure 16:
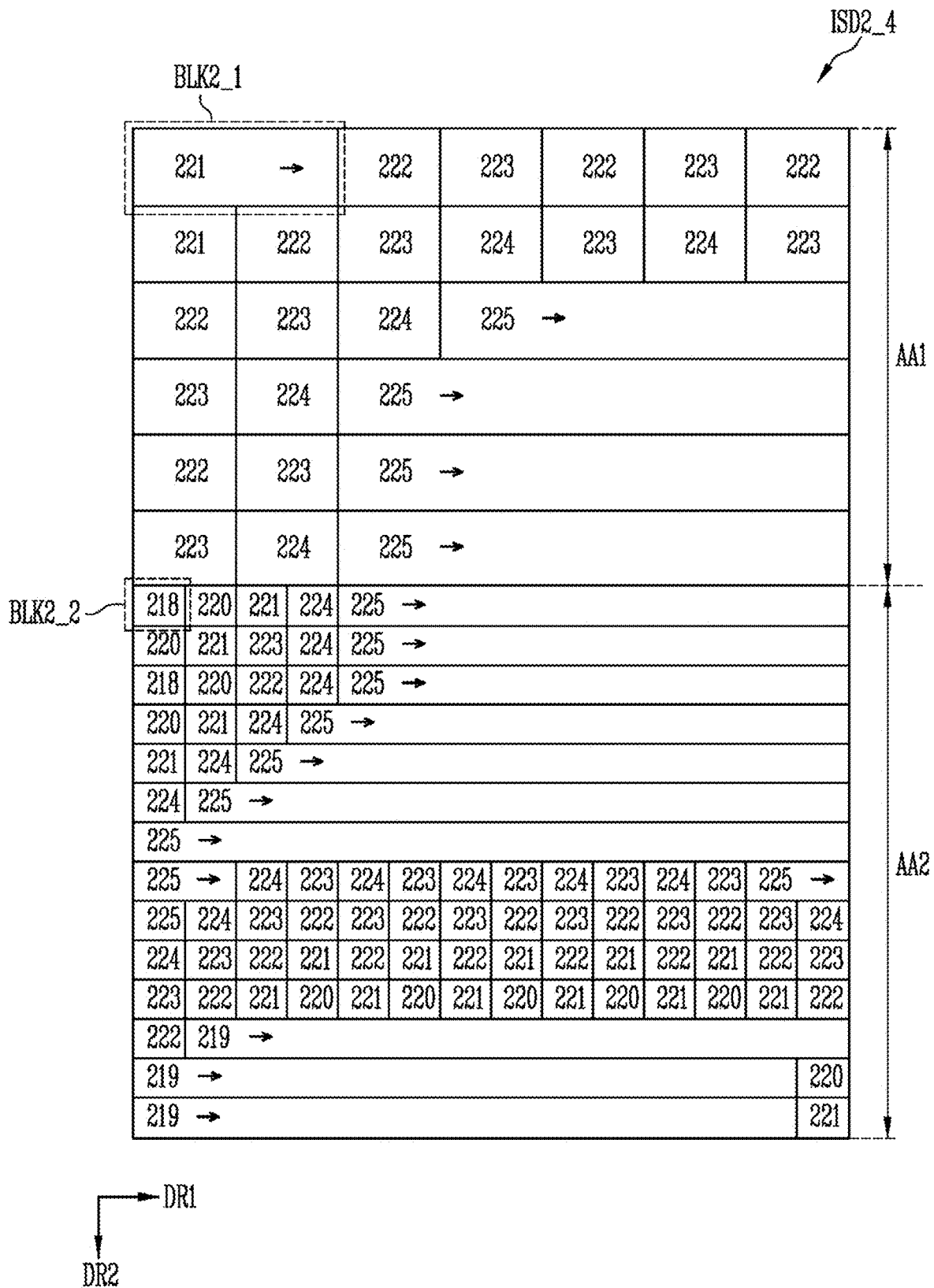

FIG. 14 is a flowchart illustrating an example embodiment of a stain compensation method using a screen calibration system. FIGS. 15 and 16 are diagrams illustrating a process for generating second parameter data in the stain compensation method using the screen calibration system of FIG. 14.

Referring to FIGS. 14, 15 and 16, the stain compensation method using the screen calibration system according to the illustrated example embodiment is different from that in the example embodiment of FIGS. 5, 9 and 10 in that first parameter data ISD1_1 has a plurality of sub-parameters AA1 and AA2 including data blocks of different sizes.

Since the operation S100 of receiving first image data and generating reference parameter data, the operation S300 of generating second parameter data, the operation S400 of storing the data in the memory 150, and the operation S500 of transmitting the second image data are performed through procedures identical or similar to those of the above-described example embodiment, repeated descriptions thereof are omitted.

The operation S201 of generating display surface data and generating first parameter data ISD1_1 according to the illustrated example embodiment may correspond to the operation where a photographing part generates display surface data by photographing the display surface and generates first parameter data ISD1_1 including the plurality of sub-parameters AA1 and AA2 using the display surface data.

The operation S201 of generating the display surface data and generating the first parameter data ISD1_1 may include a procedure for dividing parameter data into the plurality of sub-parameters AA1 and AA2 using the display surface data.

The first parameter data ISD1_1 may include the first sub-parameter AA1 composed of first data blocks BLK1_1 and the second sub-parameter AA2 composed of third data blocks BLK1_2. The first data block BLK1_1 and the third data block BLK_2 may have different sizes. That is, the first data block BLK1_1 and the third data block BLK1_2 may have the different numbers of emission areas and different shapes.

In an example embodiment, each third data block BLK1_2 may include emission areas arranged in a 4*4 matrix form, and each first data block BLK1_1 may include emission areas arranged in an 8*8 matrix form, for example.

Second parameter data ISD2_4 may be generated in such a way as to merge or not merge first data blocks BLK1_1 adjacent to each other in a first direction DR1 in the first parameter data ISD1_1 and to merge or not merge the third data blocks BLK1_2 adjacent to each other in the first direction DR1. The second parameter data ISD2_4 may include the second data blocks BLK2_1 generated by merging or not merging the first data blocks BLK1_1, and fourth data blocks BLK2_2 generated by merging or not merging the third data blocks BLK1_2. A merging direction thereof is not limited by the illustrated example embodiment.

Figure 17:
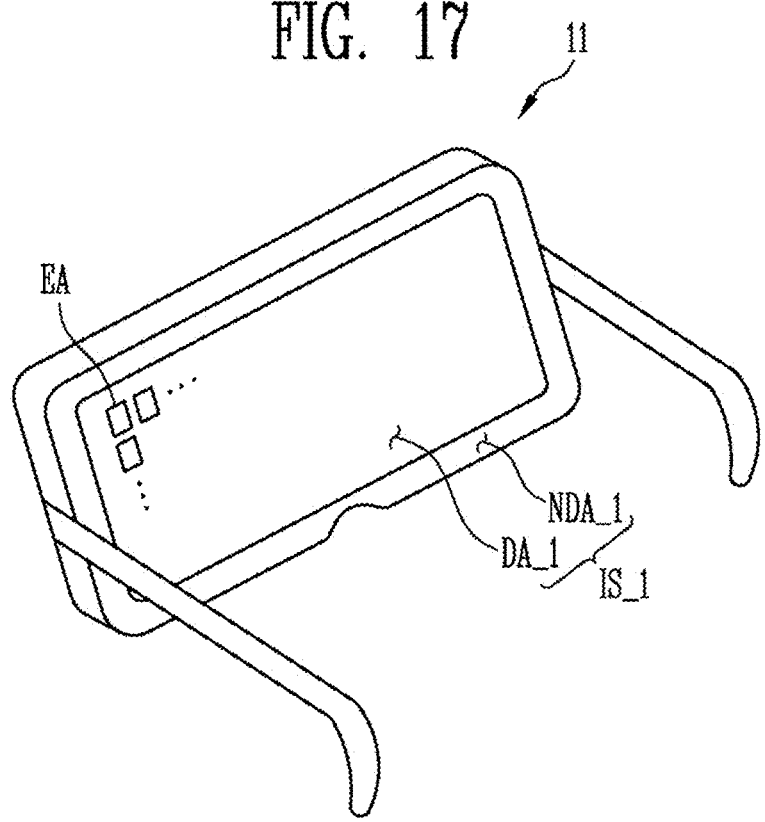
FIG. 17 is a perspective view of a display device.
Figure 18:
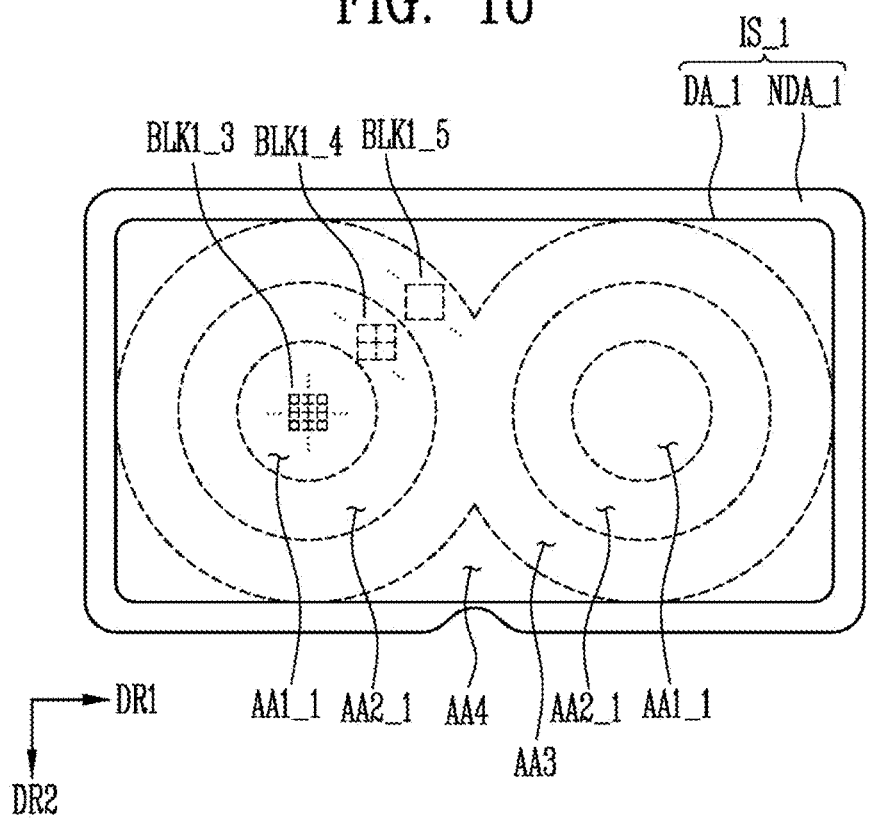
FIG. 18 is a plan view illustrating a display surface of the display device of FIG. 17.
Figure 19:
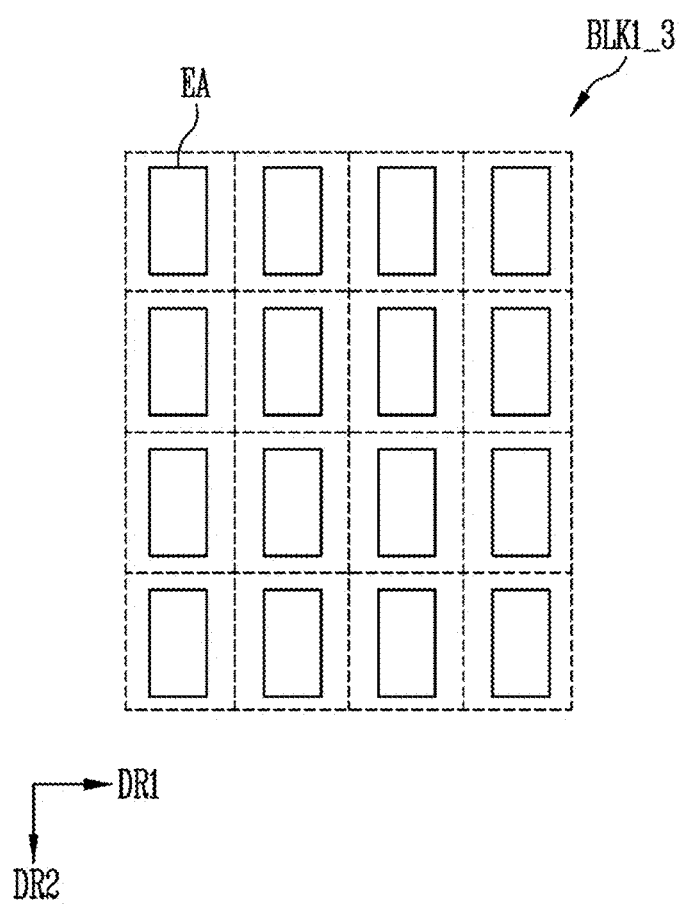
FIGS. 19 to 21 are diagrams illustrating fifth to seventh data blocks of FIG. 18.
Figure 20:
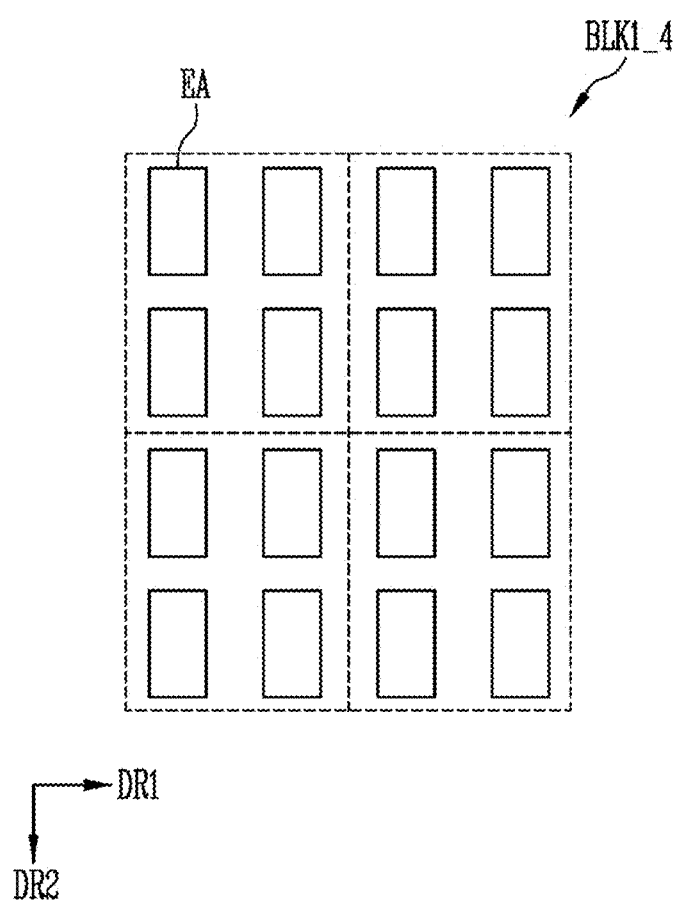
Figure 21:
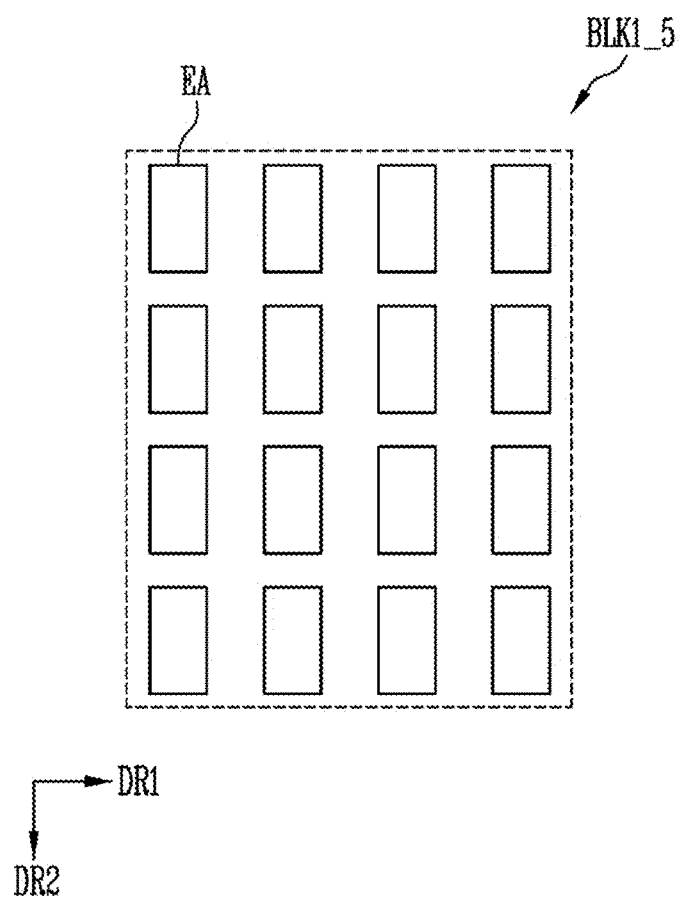

FIG. 17 is a perspective view of an example embodiment of a display device. FIG. 18 is a plan view illustrating a display surface of the display device of FIG. 17. FIGS. 19 to 21 are diagrams illustrating fifth to seventh data blocks of FIG. 18.

Referring to FIGS. 17 to 21, a display device 11 according to the illustrated example embodiment may be provided in the form of a wearable device. In an example embodiment, the display device 11 may be a head-mounted display ("HMD") device, for example.

When the display device 11 is provided in the form of an HMD, lenses (not illustrated) may be disposed to overlap a display surface IS_1, and the importance of an image quality depending on the location may differ due to the movement radius of a user's head, the angle of eyeballs, and the dispersion of the lenses. Therefore, a compensation level may vary depending on the location of the display area DA_1.

In an example embodiment, the first parameter data may have a plurality of sub-parameters including data blocks BLK1_3, BLK1_4, and BLK1_5 of different sizes. In an example embodiment, two first sub-parameters AA1_1 may be disposed in portions squarely overlapping the user's eyes, for example. Two second sub-parameters AA2_1 enclosing respective first sub-parameters AA1_1 may be disposed. A third sub-parameter AA3 enclosing the two first sub-parameters AA1_1 and the two second sub-parameters AA2_1 may be disposed, and a fourth sub-parameter AA4 may be disposed in the remaining region adjacent to an interface between a display area DA_1 and a non-display area NDA_1.

In an example embodiment, respective sub-parameters (e.g., AA1_1, AA2_1, and AA3) may include data blocks BLK1_3, BLK1_4, and BLK1_5, respectively. Some sub-parameter (e.g., AA4) may not include data blocks. In the case of such a sub-parameter (e.g., AA4), compensation may not be performed.

In an example embodiment, each first sub-parameter AA1_1 may include fifth data blocks BLK1_3, and each fifth data block BLK1_3 may include emission areas EA arranged in a 1*1 matrix form, for example. Each second sub-parameter AA2_1 may include sixth data blocks BLK1_4, and each sixth data block BLK1_4 may include emission areas EA arranged in a 2*2 matrix form. The third sub-parameter AA3 may include seventh data blocks BLK1_5, and each seventh data block BLK1_5 may include emission areas EA arranged in a 4*4 matrix form. The fourth sub-parameter AA4 may not include data blocks.

The second parameter data may be generated by merging or not merging respective data blocks in one direction depending on the average grayscale values of data blocks BLK1_3, BLK1_4, BLK1_5 for respective pieces of sub-parameter data AA1_1, AA2_1, AA3, and AA4. Since subsequent processes generate second image data through procedures identical or similar to those of the above-described example embodiment, repeated descriptions thereof will be omitted.

Figure 22:
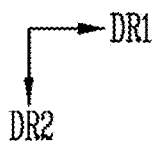
FIG. 22 is a diagram illustrating an example embodiment of a process for generating second parameter data in the stain compensation method using the screen calibration system.

FIG. 22 is a diagram illustrating an example embodiment of a process for generating second parameter data in the stain compensation method using the screen calibration system.

In the illustrated example embodiment, compared to the process of FIG. 10, the second parameter data ISD2_4 including second data blocks BLK2_3, generated by merging or not merging the first data blocks adjacent to each other in the first direction DR1 and the second direction DR2, may be generated. Since subsequent processes generate second image data through procedures identical or similar to those of the above-described example embodiment, repeated descriptions thereof will be omitted.

Figure 23:
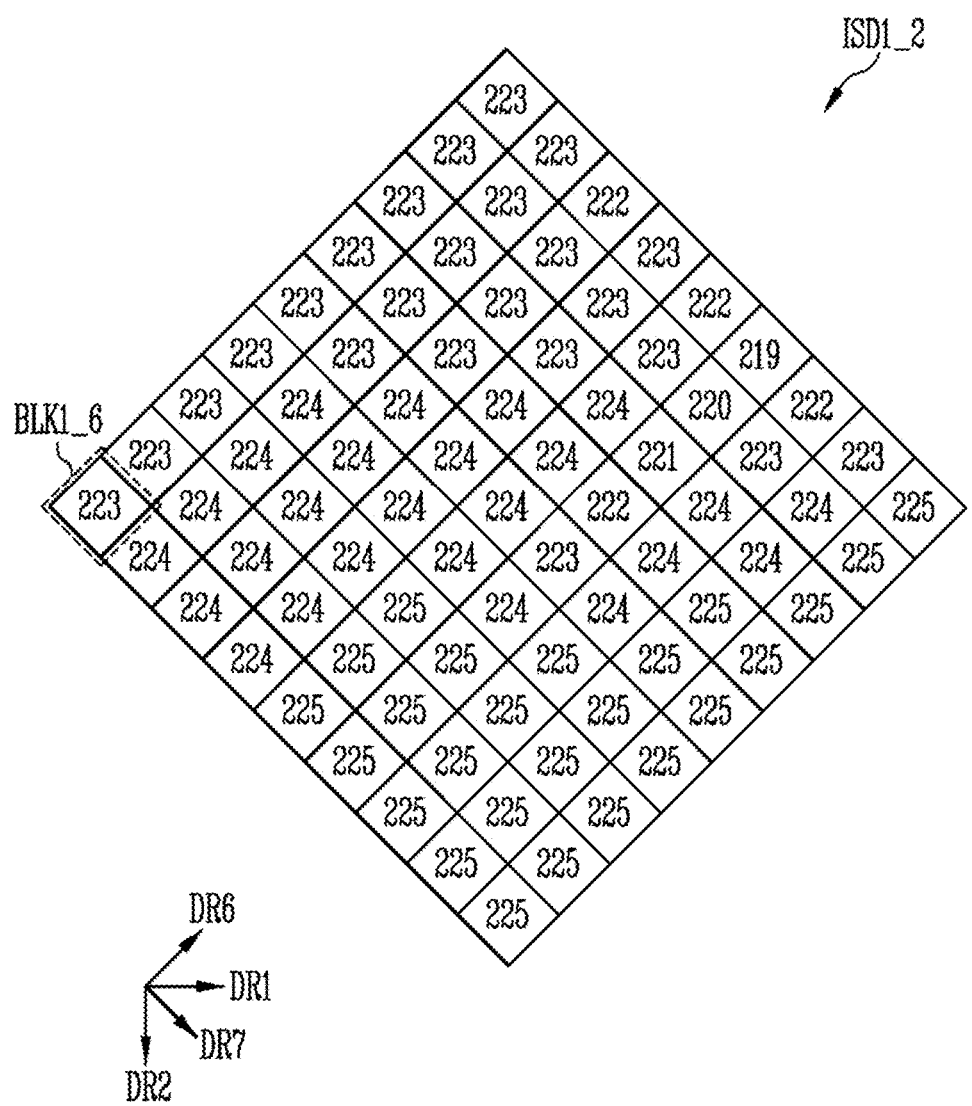
FIGS. 23 and 24 are diagrams illustrating an example embodiment of a process for generating second parameter data using first parameter data in the stain compensation method using the screen calibration system.
Figure 24:
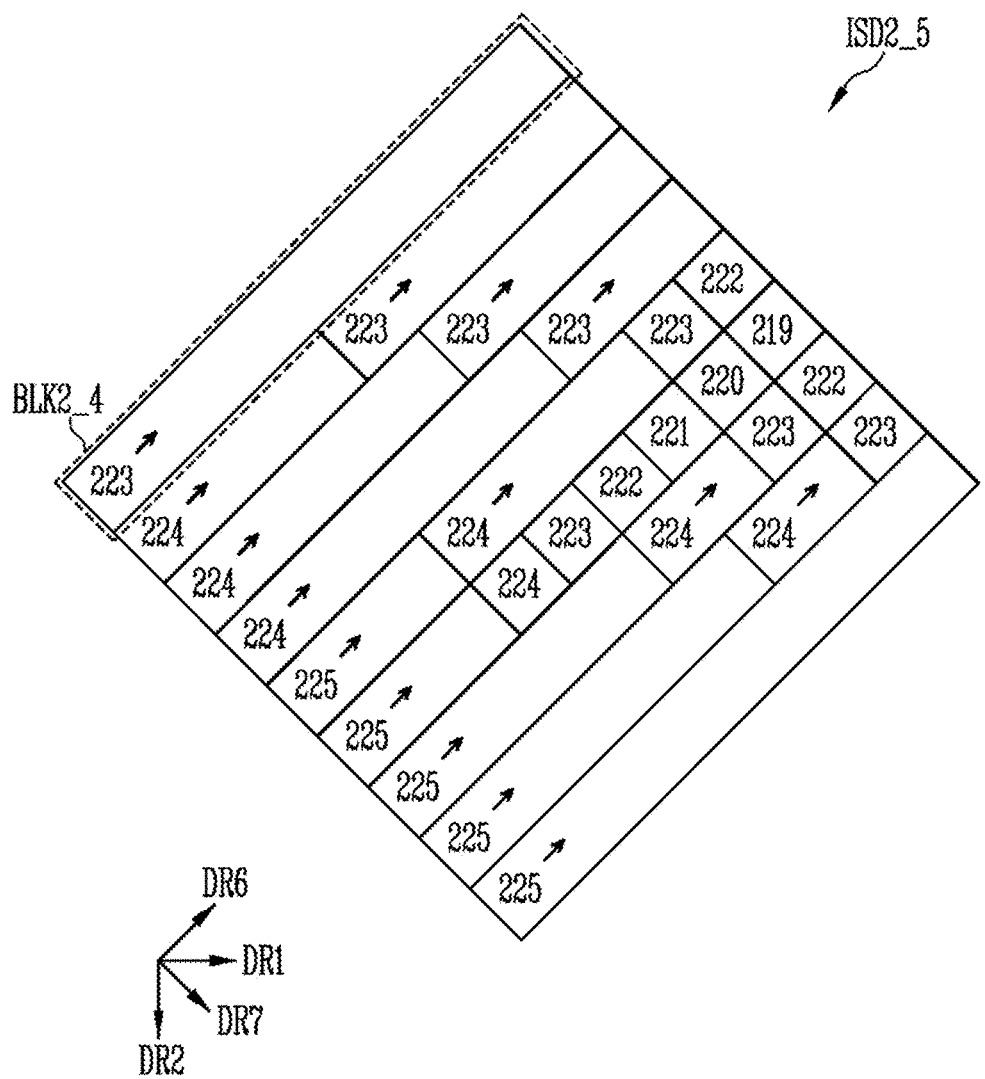

FIGS. 23 and 24 are diagrams illustrating an example embodiment of a process for generating second parameter data using first parameter data in the stain compensation method using the screen calibration system.

In the illustrated example embodiment, compared to the process of FIGS. 9 and 10, each of reference data blocks (not illustrated) and first data blocks BLK1_6 may have a diamond (lozenge) shape.

In an example embodiment, first parameter data ISD1_2 may have first data blocks BLK1_6 arranged in a net shape. Second parameter data ISD2_5 including second data blocks BLK2_4 may be generated by merging or not merging the first data blocks BLK1_6 adjacent to each other in a sixth direction DR6. Here, the sixth direction DR6 may be a direction inclined with respect to the first direction DR1 and the second direction DR2.

The merging direction of the first data blocks BLK1_6 is not limited thereto, and may be implemented as a seventh direction DR7 different from the sixth direction DR6.

When the array form of pixels (emission areas) is provided in a net shape, the illustrated example embodiment may be applied.

By example embodiments of the invention, a compensation effect may be increased while the use of memory resources is reduced.

The effects of the invention according to the example embodiments are not limited by the foregoing, and other various effects are anticipated herein.

Although the example embodiment of the invention has been disclosed, those skilled in the art will appreciate that the invention may be implemented as other concrete forms, without departing from the scope and spirit of the invention as disclosed in the accompanying claims. Therefore, it should be understood that the above-described example embodiments are only example rather than being restrictive.

What is claimed is:

1. A stain compensation method using a screen calibration system, the method comprising:
   generating first parameter data including a plurality of first data blocks, each of the plurality of first data blocks defined by at least one emission area, by photographing a display surface;
   generating second parameter data including second data blocks, the second data blocks being generated by merging first data blocks which are adjacent to each other in one direction and have an identical average grayscale value among the plurality of first data blocks; and
   storing the second parameter data in a memory,
   wherein the merging the first data blocks is continued only along the one direction until a first data black which has an average grayscale value different from the identical average greyscale value appears among the plurality of first data blocks.

2. The stain compensation method according to claim 1, wherein the second data blocks include data blocks having different sizes from each other.

3. The stain compensation method according to claim 2, wherein the second data blocks include different numbers of emission areas depending on sizes of the second data blocks.

4. The stain compensation method according to claim 2, wherein sizes of the plurality of first data blocks or numbers of emission areas included in the plurality of first data blocks are identical to each other.

5. The stain compensation method according to claim 4, wherein the plurality of first data blocks and the emission areas are arranged in a matrix form.

6. The stain compensation method according to claim 5, wherein the emission areas included in each of the plurality of first data blocks are arranged in an M*M matrix form, where M is a natural number.

7. The stain compensation method according to claim 6, wherein at least one of the second data blocks includes emission areas arranged in an M*N matrix form, where N is a natural number greater than M.

8. The stain compensation method according to claim 1, wherein, when average grayscale values of the first data blocks adjacent to each other in the one direction are different from each other, generating the second parameter data does not merge the corresponding first data blocks.

9. The stain compensation method according to claim 1, wherein:
   the one direction is a first direction, and
   generating the second parameter data merge the first data blocks which are adjacent to each other in the first direction and a second direction different from the first direction and have an identical average grayscale value.

10. The stain compensation method according to claim 9, wherein the first direction and the second direction are directions orthogonal to each other.

11. The stain compensation method according to claim 1, wherein each of the plurality of first data blocks has a diamond shape.

12. The stain compensation method according to claim 1, wherein the first parameter data includes:
   a first sub-parameter including the plurality of first data blocks; and
   a second sub-parameter including third data blocks having a size different from that of the first data blocks.

13. The stain compensation method according to claim 12, wherein generating the second parameter data generate fourth data blocks by merging third data blocks which are adjacent to each other in the one direction and have an identical grayscale value.

14. The stain compensation method according to claim 12, wherein the second sub-parameter encloses the first sub-parameter.

15. The stain compensation method according to claim 14, wherein a number of emission areas included in each of the third data blocks is less than a number of emission areas included in each of the first data blocks.

16. The stain compensation method according to claim 12, wherein the first parameter data further includes a third sub-parameter on which respective operations for stain compensation are not performed at generating the second parameter data.

17. The stain compensation method according to claim 16, wherein the screen calibration system comprises:
   a head-mounted display device including the display surface; and
   a monochrome camera which photographs the display surface of the head-mounted display device.

18. The stain compensation method according to claim 1, wherein image data on which stain compensation is performed is generated based on the second parameter data.

19. The stain compensation method according to claim 18, wherein the second parameter data includes stain compensation address information.

20. The stain compensation method according to claim 1, wherein average grayscale values of the plurality of first data blocks are selected from among values from 0 to 225.

* * * * *